United States Patent
Shibuya et al.

(10) Patent No.: US 12,535,544 B2
(45) Date of Patent: Jan. 27, 2026

(54) STATIC MAGNETIC FIELD MAGNET AND MRI APPARATUS

(71) Applicant: CANON MEDICAL SYSTEMS CORPORATION, Otawara (JP)

(72) Inventors: Takehiro Shibuya, Nasushiobara (JP); Hiromi Kawamoto, Yaita (JP); Sadanori Tomiha, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 118 days.

(21) Appl. No.: 18/459,584

(22) Filed: Sep. 1, 2023

(65) Prior Publication Data

US 2024/0077559 A1 Mar. 7, 2024

(30) Foreign Application Priority Data

Sep. 5, 2022 (JP) .................. 2022-140743

(51) Int. Cl.
*G01R 33/3815* (2006.01)
*G01R 33/385* (2006.01)

(52) U.S. Cl.
CPC ..... *G01R 33/3815* (2013.01); *G01R 33/3856* (2013.01)

(58) Field of Classification Search
CPC ............ G01R 33/3815; G01R 33/3856; G01R 33/3806; G01R 33/3804
See application file for complete search history.

(56) References Cited

U.S. PATENT DOCUMENTS

| 2014/0274722 A1* | 9/2014 | Calvert ..................... H01F 6/06 335/216 |
| 2018/0144851 A1* | 5/2018 | Li .......................... H01F 27/322 |
| 2023/0057231 A1* | 2/2023 | Xu ..................... G01R 33/3854 |

FOREIGN PATENT DOCUMENTS

| JP | 6-5419 A | 1/1994 |
| JP | H07142772 A | * 6/1995 |

* cited by examiner

*Primary Examiner* — Daniel R Miller
(74) *Attorney, Agent, or Firm* — Oblon, McClelland, Maier & Neustadt, L.L.P.

(57) ABSTRACT

A static magnetic field magnet according to any of embodiments includes: a vacuum vessel; a radiation shield provided inside the vacuum vessel; a superconducting coil provided inside the radiation shield, the superconducting coil generating a static magnetic field; and a winding frame supporting the superconducting coil and including a heat-generation suppression shield having a surface layer on a gradient coil side and an inner layer on the superconducting coil side. In the static magnetic field magnet, the surface layer and the inner layer are structurally or functionally separated from each other, the surface layer is configured as a layer where an eddy current generated in the winding frame flows, and the inner layer is configured as a layer where an eddy current does not almost flow.

7 Claims, 8 Drawing Sheets

LINE A-A SECTIONAL VIEW

LINE B-B SECTIONAL VIEW

STATIC MAGNETIC FIELD MAGNET AND MRI APPARATUS

CROSS-REFERENCE TO RELATED APPLICATION

This application is based upon and claims the benefit of priority from Japanese Patent Application No. 2022-140743, filed on Sep. 5, 2022, the entire contents of which are incorporated herein by reference.

FIELD

Disclosed Embodiments relate to a static magnetic field magnet and a magnetic resonance imaging (MRI) apparatus.

BACKGROUND

An MRI apparatus is an imaging apparatus that uses a radio frequency (RF) signal having the Larmor frequency for exciting nuclear spin of an object such as a patient placed in a static magnetic field generated by a static magnetic field magnet and reconstructs an image on the basis of magnetic resonance (MR) signals emitted from the object due to the excitation.

The static magnetic field magnet includes a vacuum vessel, a radiation shield, a helium vessel, a superconducting coil, and a winding frame. The winding frame supports the superconducting coil of the static magnetic field magnet, and also serves as part of the helium vessel. Thus, there is a gap of only a few millimeters between the outer frame of the helium vessel and the superconducting coil. Accordingly, the heat due to an eddy current caused by gradient-coil induced heating (GCIH) is directly transmitted to the superconducting coil, which increases probability of occurrence of quench.

BRIEF DESCRIPTION OF THE DRAWINGS

Each of FIG. 3A

DETAILED DESCRIPTION

Hereinbelow, embodiments of the present invention will be described by referring to the accompanying drawings.

A static magnetic field magnet according to any of embodiments includes: a vacuum vessel; a radiation shield provided inside the vacuum vessel; a superconducting coil provided inside the radiation shield, the superconducting coil generating a static magnetic field; and a winding frame supporting the superconducting coil and having a heat-generation suppression shield including a surface layer on a gradient coil side and an inner layer on the superconducting coil side. The surface layer and the inner layer are structurally or functionally separated from each other, and the surface layer is configured as a layer where an eddy current generated in the winding frame flows, while the inner layer is configured as a layer where an eddy current does not almost flow.

MRI apparatuses provided with one or more static magnetic field magnets according to the embodiments are roughly classified into a planar-open-magnet MRI apparatus and a cylindrical MRI apparatus. The planar-open-magnet MRI apparatus has tabular (i.e., flat-plate-shaped) static magnetic field magnets and tabular gradient coils and is configured to image an object such as a patient in an open space sandwiched between, for example, two tabular static magnetic field magnets.

The cylindrical MRI apparatus has a structure called a magnet unit or a gantry and forms a cylindrical space called a bore in the gantry. A patient lying on a table is transported into the bore and imaged inside the bore. Inside the gantry, a cylindrical static magnetic field magnet, a cylindrical gradient coil, and a cylindrical transmitting coil (for example, a WB (Whole Body) coil) are housed. That is, in the cylindrical MRI apparatus, each of the static magnetic field magnet, the gradient coil, and the transmitting coil has an approximately cylindrical shape.

In the case of the cylindrical MRI apparatus, the patient is exposed to noise for a long time in a narrow space inside the bore and forced to remain immobile during imaging. If the patient moves during imaging using the cylindrical MRI apparatus, an artifact may be included in the image, which may interfere with diagnosis. Further, in the case of the cylindrical MRI apparatus, it is difficult to perform imaging in a free posture, as exemplified by a case of imaging a patient with a curved spine. The planar-open-magnet MRI apparatus can solve such problems of the cylindrical MRI apparatus.

Among the MRI apparatuses according to the embodiments, the planar-open-magnet MRI apparatus will be described in the first embodiment, and the cylindrical MRI apparatus will be described in the second embodiment.

First Embodiment

Figure 1:
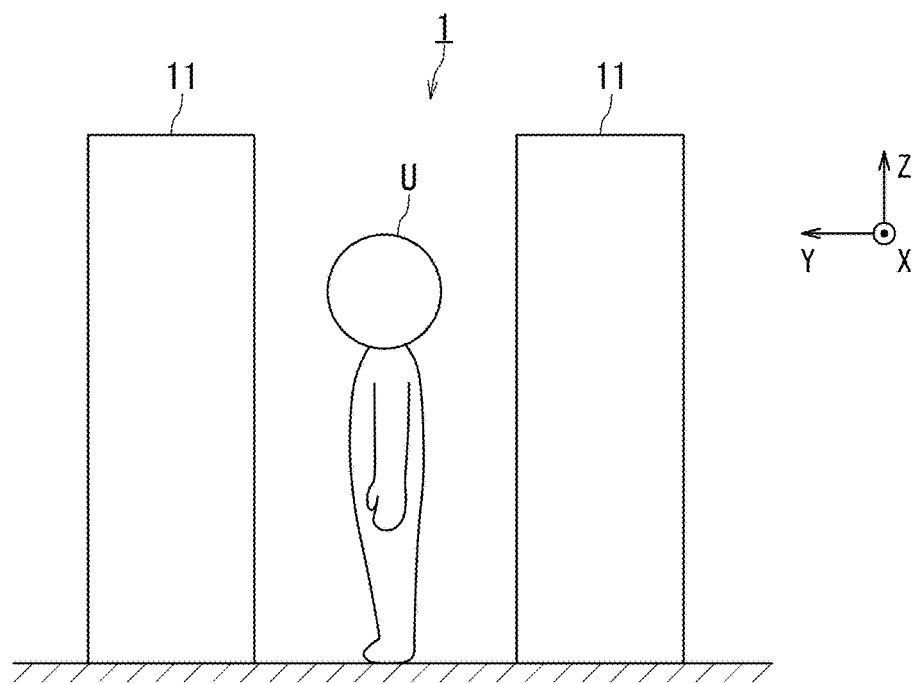
FIG. 1 is a diagram illustrating the first configuration example of an MRI apparatus according to the first embodiment.

FIG. 1 is a diagram illustrating the first configuration example (for a standing posture) of a planar-open-magnet MRI apparatus 1 according to the first embodiment, particularly focusing on arrangement of its static magnetic field magnets 11. As shown in FIG. 1, the MRI apparatus 1 includes two static magnetic field magnets 11 in the shape of circular plates (i.e., approximately thin cylinders), for example.

The static magnetic field magnets 11 are arranged such that the central axis of the static magnetic field magnets 11 (i.e., axis passing through the respective centers of both circular bottom surfaces of the approximately cylindrical shape) is parallel to the Y-axis direction defined as the anterior-posterior direction of an object such as a patient U. The X-axis direction is defined as the right-left direction of the patient U, and the Z-axis direction is defined as the head-foot direction of the patient U. Further, the two static magnetic field magnets 11 are arranged so as to sandwich the patient U.

Under such arrangement of the static magnetic field magnets 11, a magnetic field is generated in the free space between the two static magnetic field magnets 11. The patient U is imaged in this open space in a standing posture, for example.

When the static magnetic field magnets 11 are configured by using superconducting coils, the static magnetic field is generated by applying electric currents supplied from a static magnetic field power supply to the superconducting coils in an excitation mode. Afterward, when the static magnetic field magnets 11 shift to a persistent current mode, the static magnetic field power supply is disconnected and the static magnetic field magnets continue to generate the static magnetic field of constant strength. The static magnetic field magnets can also be configured as permanent magnets.

Figure 2:
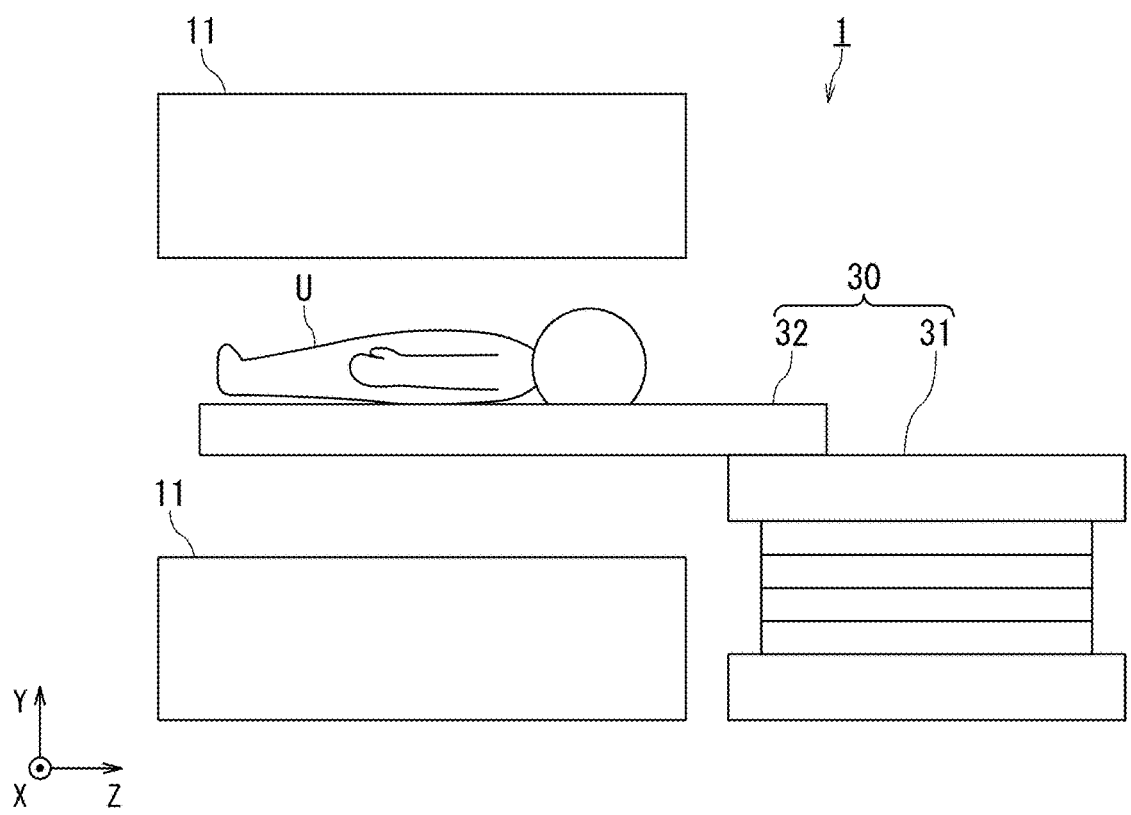
FIG. 2 is a diagram illustrating the second configuration example of the MRI apparatus according to the first embodiment.

FIG. 2 is a diagram illustrating the second configuration example (for a lying posture) of the MRI apparatus 1, particularly focusing on the arrangement of the static magnetic field magnets 11. FIG. 1 illustrates a configuration for imaging the patient U in the standing posture, and FIG. 2 illustrates a configuration for imaging the patient U lying on a bed table 32 extending from a bed body 31. This second configuration of the MRI apparatus 1 has a bed 30, which is different from FIG. 1.

The bed 30 includes the bed body 31 and the bed table 32. The bed body 31 can move the bed table 32 vertically and horizontally, and moves the patient U placed on the bed table 32 to a predetermined height before imaging. Then, during time of imaging, the bed table 32 is moved horizontally so as to move the patient U to an imaging region.

In the case of imaging the patient U in the lying posture, the static magnetic field magnets 11 are arranged such that their central axis matches the vertical direction as shown in FIG. 2. For example, one of the static magnetic field magnets 11 is disposed below the bed table 32 and the other static magnetic field magnet 11 is disposed above the bed table 32.

Figure 3B:
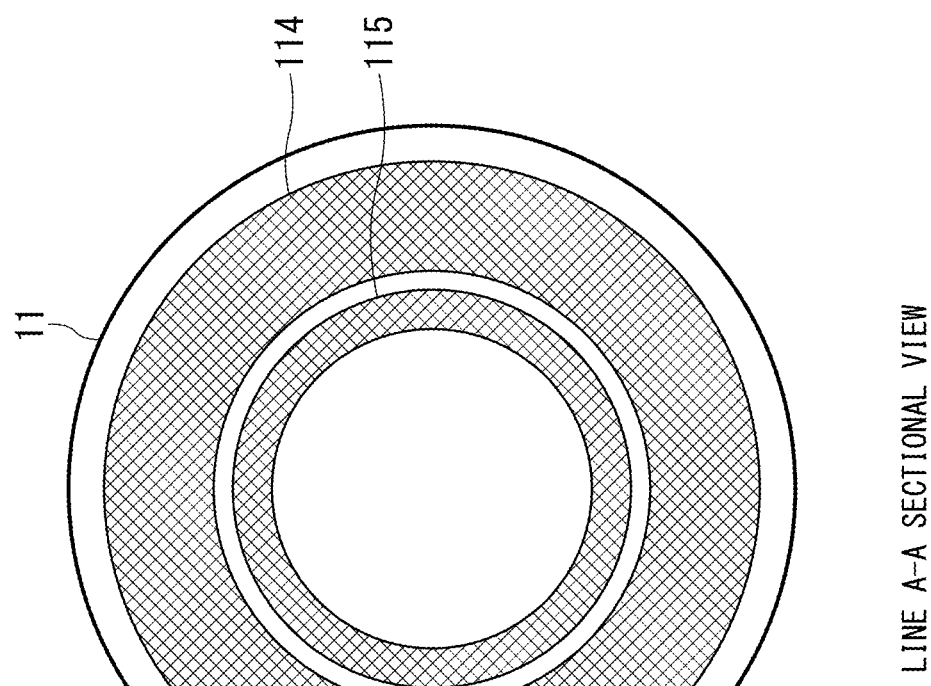
FIG. 3B is a diagram illustrating an internal configuration of a static magnetic field magnet provided in the MRI apparatus according to the first embodiment.
Figure 3A:
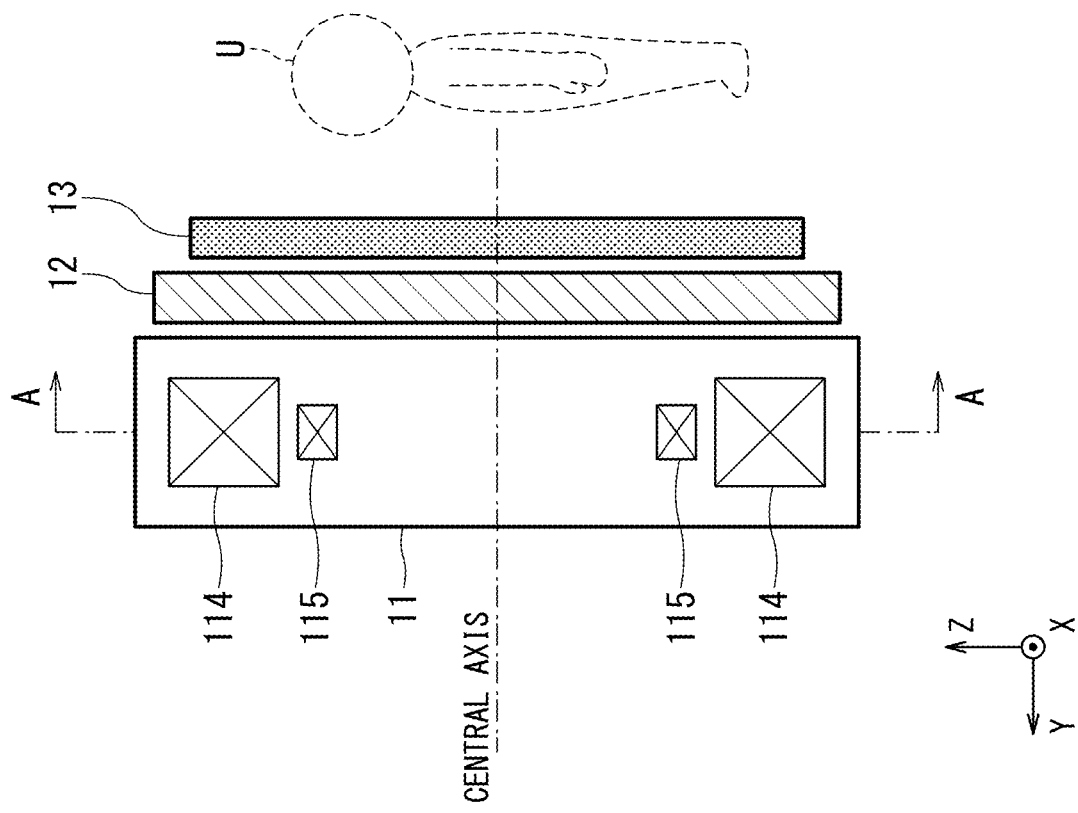

Each of FIG. 3A and FIG. 3B is a diagram illustrating an internal configuration of the static magnetic field magnet 11. FIG. 3A illustrates an internal cross-section of the static magnetic field magnet 11 as viewed from the direction orthogonal to its central axis. FIG. 3B illustrates an internal cross-section of the static magnetic field magnet 11 as viewed from the central axis direction, and is a cross-sectional view taken along the line A-A of FIG. 3A.

One of the two static magnetic field magnets 11 is placed in front of the patient U, and each static magnetic field magnet 11 includes one or more superconducting coils. The one or more superconducting coils are housed in, for example, a flat plate-shaped magnet housing having a pre-determined thickness, i.e., a vacuum vessel 111 (shown in FIG. 5). In the case shown in FIG. 3A and FIG. 3B, inside the vacuum vessel 111, two circular superconducting coils 114 and 115 different in cross-sectional area from each other are accommodated, for example. The superconducting coils 114 and 115 generate the static magnetic field that determines the magnetic resonance frequency.

The MRI apparatus 1 includes two gradient coils 12 and two transmitting coils 13. The two gradient coils 12 are interposed between the two static magnetic field magnets 11 so as to be adjacent to the vacuum vessel 111, and generate a gradient magnetic field to be superimposed on the static magnetic field. The two transmitting coils 13 are interposed between the two gradient coils 12 and apply a high frequency pulse, i.e., an RF (Radio Frequency) pulse to the patient U. Each gradient coil 12 is configured as a flat plate-shaped coil, for example. Each transmitting coil 13 is also configured as a flat plate-shaped coil, for example.

Figure 4:
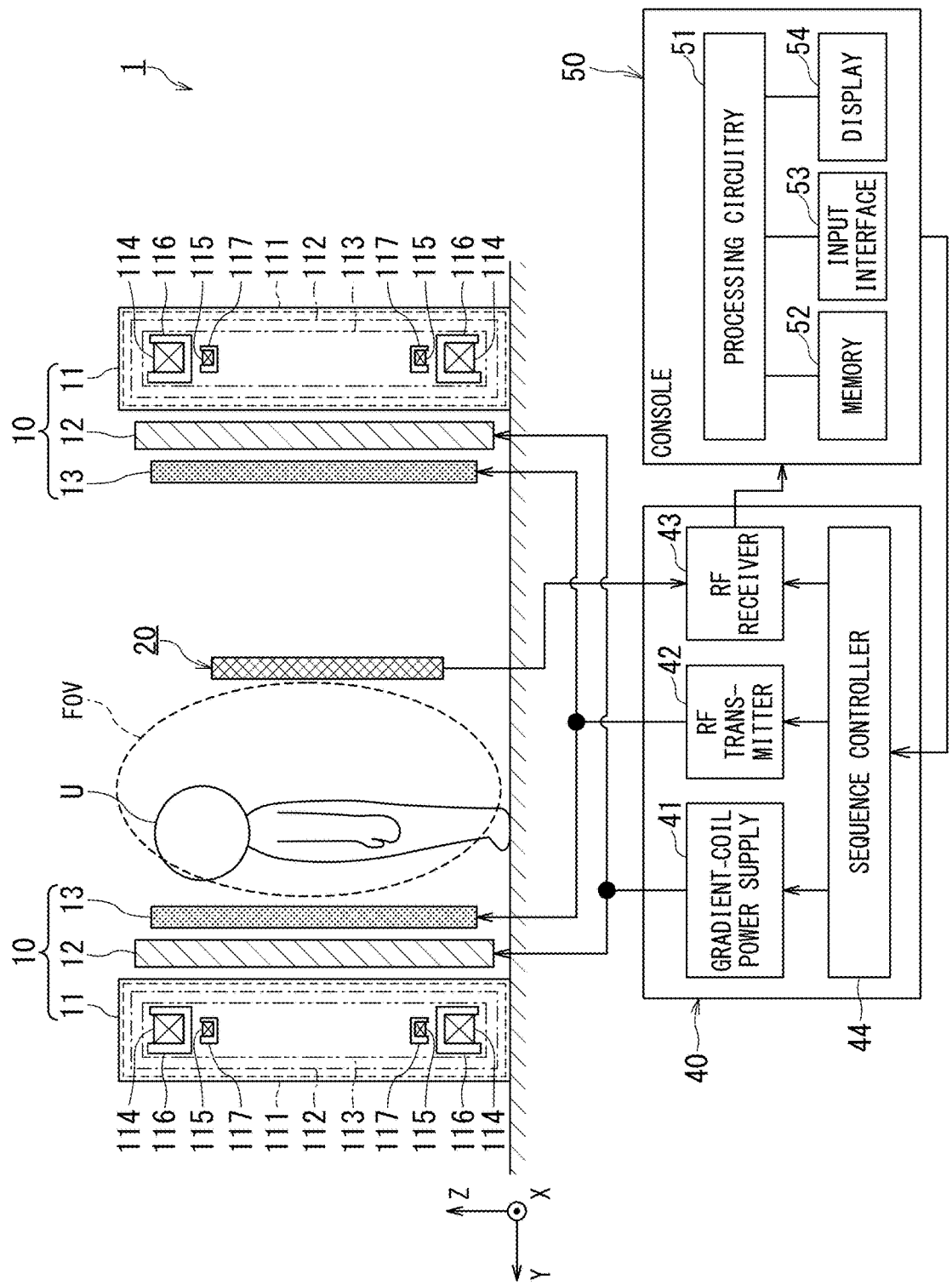
FIG. 4 is a block diagram illustrating a configuration example of the MRI apparatus according to the first embodiment.

FIG. 4 is a block diagram illustrating the second configuration of the MRI apparatus 1. This MRI apparatus 1 includes: two magnet units 10; a receiving coil 20; a control cabinet 40; and an image processing device (for example, a console) 50. The magnet units 10 and the receiving coil 20 are usually arranged in an examination room configured as a shield room. The control cabinet 40 is disposed in, for example, another room called a machine room. The console 50 is disposed in a control room. The second configuration (for the lying posture) of the MRI apparatus 1 is equivalent to the first configuration (for the standing posture) shown in FIG. 4 except the bed 30 shown in FIG. 2.

Each of the two magnet units 10 includes the static magnetic field magnet 11, the gradient coil 12, and the transmitting coil 13. The two magnet units 10 are arranged so as to face each other with the patient U interposed therebetween.

Each static magnetic field magnet 11 includes: a vacuum vessel 111; a radiation shield 112 disposed inside the vacuum vessel 111; superconducting coils 114 and 115 disposed inside the radiation shield 112; a winding frame 116 that supports the superconducting coil 114; a winding frame 117 that supports the superconducting coil 115; and a helium vessel 113 that houses (i.e., accommodates) the superconducting coils 114 and 115 and the winding frames 116 and 117. Each static magnetic field magnet 11 contains the superconducting coils 114 and 115 that are cooled down to cryogenic temperature by liquid helium. The static magnetic field magnets 11 generate the static magnetic field by applying electric currents supplied from the static magnetic field power supply (not shown) to the superconducting coils 114 and 115 in the excitation mode. Afterward, when the static magnetic field magnets 11 shift to the persistent current mode, the static magnetic field power supply is disconnected. Once shifting to the persistent current mode, the static magnetic field magnets 11 continue to generate the static magnetic field for a long time, for example, over one year.

The configuration of each static magnetic field magnet 11 will be described below by using FIG. 5 to FIG. 7.

Each gradient coil 12 is installed on the inner side of the static magnetic field magnets 11. The two gradient coils 12 generate a gradient magnetic field by electric currents (power) supplied from the gradient-coil power supply 41 described below, and apply the gradient magnetic field to the patient U. Each gradient coil 12 includes: an X-channel coil configured to generate a gradient magnetic field in the X-axis direction; a Y-channel coil configured to generate a gradient magnetic field in the Y-axis direction; and a Z-channel coil configured to generate a gradient magnetic field in the Z-axis direction.

Since an eddy magnetic field, which is generated by an eddy current resulting from generation of the gradient magnetic field interferes with imaging, an ASGC (Actively Shielded Gradient Coil) for the purpose of reducing the eddy current may be used for each gradient coil 12, for example. The ASGC is a gradient coil in which shield coils for suppressing leakage magnetic fields are provided outside the main coils configured to generate the respective gradient magnetic fields in the orthogonal three-axis directions including the X-axis, Y-axis, and Z-axis directions.

The transmitting coils 13 are installed on the inner side of the gradient coils 12. The transmitting coils 13 transmit an RF pulse toward the patient U in accordance with the RF pulse signal transmitted from the RF transmitter 42 described below. When an excitation pulse transmitted from the transmitting coils 13 is applied to the patient U, an MR signal is emitted from the patient U in response to the application of this excitation pulse. This MR signal is received by the receiving coil 20. The receiving coil 20 is configured as, for example, a planar receiving antenna with a certain extent of area in two dimensions.

The receiving coil 20 is disposed at a position slightly away from the magnet unit 10 such that the patient U is interposed between the receiving coil 20 and the left magnet unit 10 as shown on the left side of the sheet of FIG. 4. An imaging space (or FOV (Field of View)) is formed between the left magnet unit 10 and the receiving coil 20. The receiving coil 20 may include multiple coil elements. A coil in which the multiple of these coil elements are arranged in an array is sometimes referred to as a PAC (Phased Array Coil).

Next, the control cabinet 40 will be described. The control cabinet 40 includes: a gradient-coil power supply 41 (for the X-axis, the Y-axis, and the Z-axis); an RF transmitter 42; an RF receiver 43; and a sequence controller 44.

The gradient-coil power supply 41 includes three gradient-magnetic-field power sources that correspond to the respective three channels and drive the gradient coils for generating the gradient magnetic fields in the X-axis, Y-axis, and Z-axis directions. The gradient-coil power supply 41 outputs necessary electric currents independently for each channel in accordance with an instruction from the sequence controller 44. As a result, the gradient coils 12 can apply the respective gradient magnetic fields in the X-axis, Y-axis, and Z-axis directions to the patient U.

The RF transmitter 42 generates an RF pulse signal on the basis of an instruction from the sequence controller 44. The RF transmitter 42 transmits the generated RF pulse signal to the transmitting coils 13.

The MR signals received by the receiving coil 20, more specifically, the MR signals received by the respective coil elements in the receiving coil 20 are transmitted to the RF receiver 43. The output line of each coil element is called a channel. Thus, the MR signal to be outputted from each coil element is sometimes called a channel signal.

The RF receiver 43 performs AD (Analog to Digital) conversion on the channel signals, i.e., on the MR signals, from the receiving coil 20, and outputs the converted MR signals to the sequence controller 44. The MR signals converted into digital signals are sometimes referred to as raw data.

The sequence controller 44 performs imaging of the patient U by driving the gradient-coil power supply 41, the RF transmitter 42, and the RF receiver 43 under the control of the console 50. When receiving the raw data from the RF receiver 43 by executing an imaging sequence, the sequence controller 44 transmits the raw data to the console 50.

Next, the console 50 will be described. The console 50 includes processing circuitry 51, a memory 52, an input interface 53, and a display 54.

The processing circuitry 51 may be configured as hardware such as a programmable logic device and an ASIC (Application Specific Integrated Circuit) or may be configured as a processor that executes predetermined programs or software. In the latter case, the processing circuitry 51 can be configured by including, for example, a special-purpose or general purpose CPU (Central Processing Unit) or MPU (Micro Processor Unit). Aspects of the programmable logic device include a circuit such as an SPLD (Simple Programmable Logic Device), a CPLD (Complex Programmable Logic Device), and an FPGA (Field Programmable Gate Array), for example. The processing circuitry 51 achieves the function of controlling the operation of the sequence controller 44 and performing imaging in accordance with the pulse sequence to generate MR images by reading in and executing the programs, which are stored in the memory 52 or directly incorporated into the processing circuitry 51.

The processing circuitry 51 may be configured with a single processing circuit element or may be configured by combining multiple independent processing circuit elements. In the latter case, multiple memories 52 may individually store the programs corresponding to the functions the multiple independent processing circuit elements or a single memory 52 may collectively store the programs corresponding to the functions of all the processing circuit elements.

The memory 52 is composed of a semiconductor memory element such as a RAM (Random Access Memory) and a flash memory, a hard disk, and/or an optical disk, for example. The memory 52 may include a portable medium such as a USB (Universal Serial bus) memory and a DVD (Digital Video Disk). The memory 52 stores: various processing programs (including, for example, application programs and an operating system) to be executed by the processing circuitry 51; data necessary for executing the programs; and medical images. The operating system may also include a GUI (Graphic User Interface) that frequently uses graphics to display information on the display 54 for the user and allows basic operations to be performed via the input interface 53.

The input interface 53 includes: an input device that can be operated by a user; and an input circuit to which signals from the input device are inputted. The input device is achieved by: a track ball; a switch; a mouse; a keyboard; a touch pad by which input operation is achieved by touching its operation screen; a touch screen in which the display screen and the touch pad are integrated; a non-contact input device using an optical sensor; and/or a voice input circuit, for example. When the input device is operated by a user, the input circuit generates an electric signal based on the input operation and outputs the electric signal to the processing circuitry 51.

The display 54 is composed of a general display output device such as a liquid crystal display and an OLED (Organic Light Emitting Diode) display. The display 54 displays various information items under the control of processing circuitry 51.

Under the control of the processing circuitry 51, the console 50 fills k-space (i.e., frequency space) with the raw data transmitted from the sequence controller 44, and stores the obtained k-space data in the memory 52. Under the control of the processing circuitry 51, the console 50 generates a desired MR image depicting the inside of the patient U by performing reconstruction processing such as inverse Fourier transform on the k-space data stored in the memory 52. Further, the console 50 stores various generated MR images in the memory 52 under the control of the processing circuitry 51.

Next, the configuration of each static magnetic field magnet 11 will be described by using FIG. 5 to FIG. 7.

Figure 5:
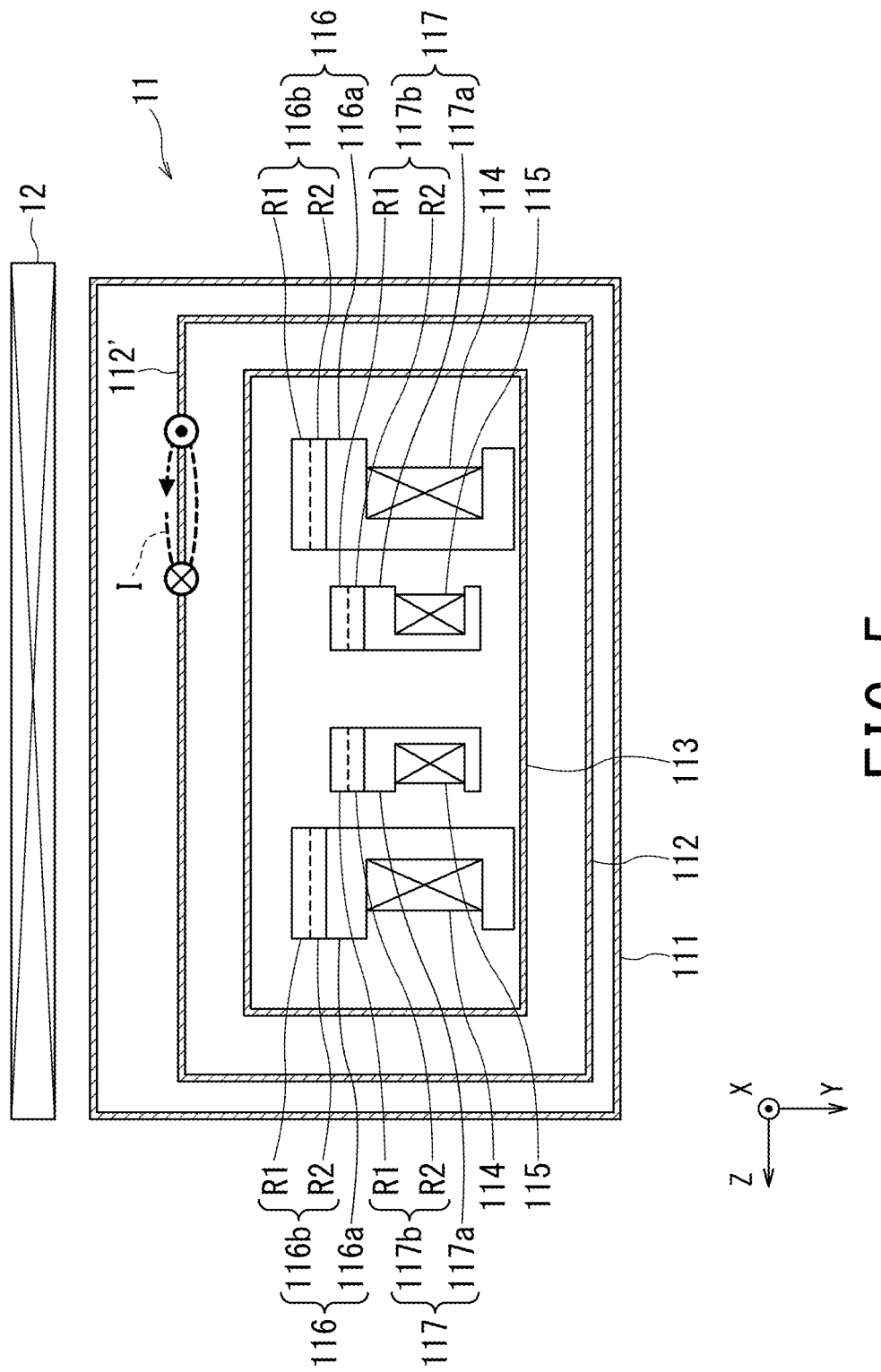
FIG. 5 is a cross-sectional view illustrating a configuration of the static magnetic field magnet and the gradient coil both provided in the MRI apparatus according to the first embodiment.

FIG. 5 is a cross-sectional view illustrating the configuration of each static magnetic field magnet 11 and each gradient coil 12. As shown in FIG. 5, the static magnetic field magnet 11 is housed in a vacuum vessel 111 having an approximately cylindrical shape in which the axis passing through the respective centers of both circular bottom surfaces is parallel to the Y-axis. The static magnetic field magnet 11 includes: a radiation shield 112; a refrigerant container (for example, a helium vessel 113); the superconducting coils 114 and 115; and the winding frames 116 and 117. Note that helium vessel 113 is not necessarily a required component for the static magnetic field magnet 11.

The radiation shield 112 has an approximately cylindrical shape in which the axis passing through the respective centers of both circular bottom surfaces is parallel to the Y-axis similarly to the vacuum vessel 111, and is provided inside the vacuum vessel 111 so as to surround the helium vessel 113 (i.e., the superconducting coils 114 and 115). The helium vessel 113 has an approximately cylindrical shape in which the axis passing through the respective centers of both circular bottom surfaces is parallel to the Y-axis similarly to the vacuum vessel 111, is provided inside the radiation shield 112, and holds the liquid helium. The superconducting coils 114 and 115 are provided inside the helium vessel 113 and generate the static magnetic field. The superconducting coil 114 is disposed on and wound around by the winding frame 116 and the superconducting coil 115 is disposed on and wound around by the winding frame 117 such that the winding frames 116 and 117 fix and support the superconducting coils 114 and 115. The static magnetic field magnet 11 is provided with a refrigerator (not shown) for cooling down the liquid helium to cryogenic temperature. Additionally, the static magnetic field magnet 11 may be configured as a permanent magnet.

The radiation shield 112 is disposed between the vacuum vessel 111 and the helium vessel 113, and is cooled by the refrigerator (not shown) so as to achieve the function of reducing the evaporation amount of the liquid helium in the helium vessel 113 caused by radiation. In order to provide the radiation shield 112 with such a function, a non-magnetic metal material with high heat transfer performance is used for the radiation shield 112 in general. Such a metal material has characteristics of high electrical conductivity (i.e., high electrical conductance).

Figure 6A:
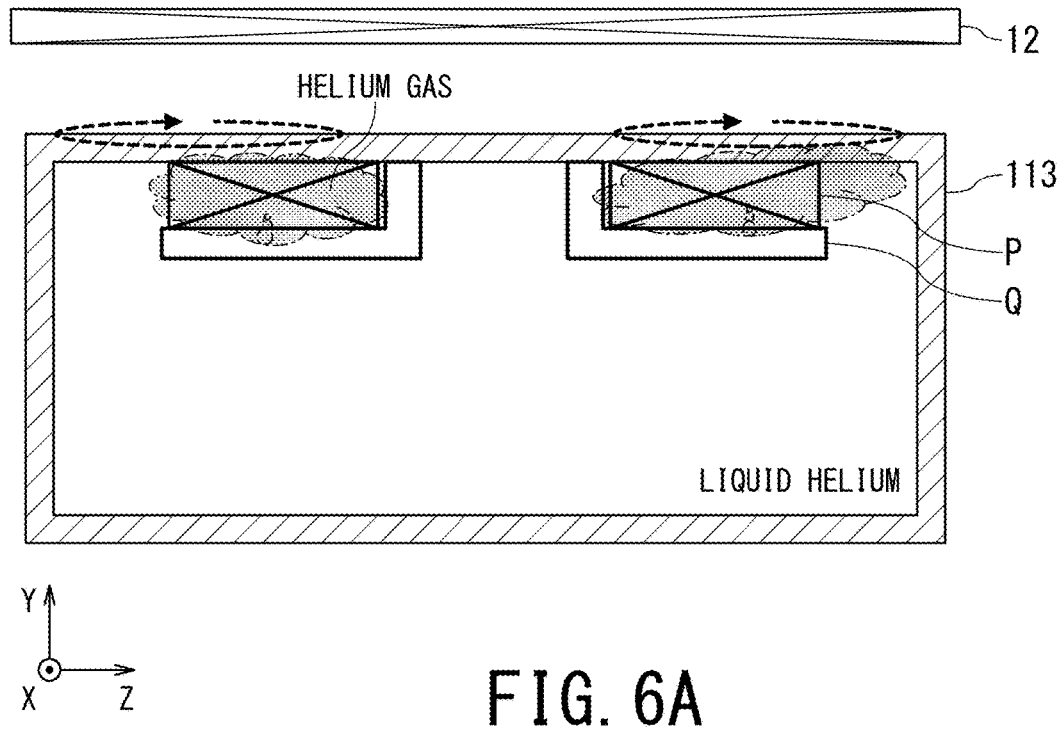
FIG. 6A is a diagram illustrating a configuration example of a helium vessel provided in an MRI apparatus according to a comparative example.

Hence, due to the gradient-coil induced heating (GCIH) caused by the operation of the gradient coil 12, a large eddy current I is generated in the radiation shield 112, and the eddy currents are also generated in the helium vessel 113 as shown by the dashed arrows in FIG. 6A.

In FIG. 6A illustrating a comparative example, the helium vessel 113 also serves as part of a winding frame Q which supports the superconducting coil of the static magnetic field magnet. In other words, the winding frame Q is fixed to the outer frame of the helium vessel 113. Accordingly, the distance between the outer frame of the helium vessel 113 and the superconducting coil P is only a few millimeters, thereby the heat due to the eddy currents generated in the helium vessel 113 is directly transmitted to the superconducting coil P via the winding frame Q, and because heat dissipation is structurally small, these factors increases probability of occurrence of quench.

Figure 6B:
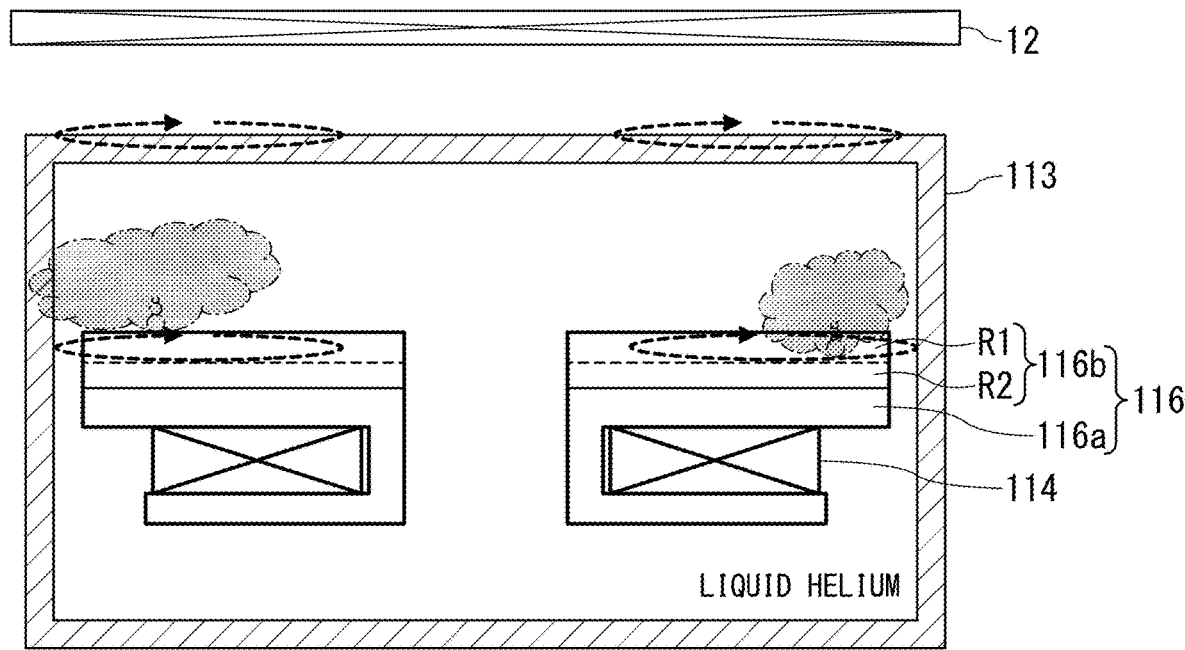
FIG. 6B is a diagram illustrating a configuration example of a helium vessel provided in the MRI apparatus according to the first embodiment.

For this reason, as shown in FIG. 5 and FIG. 6B, the winding frame 116 is not fixed to the outer frame of the helium vessel 113 and includes: a winding-frame main-body 116a that supports the superconducting coil 114; and a heat-generation suppression shield 116b. The heat-generation suppression shield 116b is disposed between the gradient coil 12 and the superconducting coil 114 on the side of the gradient coil 12 so as to suppress the heat generated in the helium vessel 113.

The heat-generation suppression shield 116b is made of a metal material such as stainless steel and aluminum. However, the heat-generation suppression shield 116b itself also generates an eddy current (dashed arrow in FIG. 6B) due to the leakage magnetic field of the gradient coil 12. Thus, the heat-generation suppression shield 116b preferably has a two-layer structure composed of: a surface layer R1 provided on the side of the gradient coil 12 and configured as a layer where the eddy current generated in the winding frame 116 flows; and an inner layer R2 provided on the side of the superconducting coil 114 and configured as a layer where the eddy current does not almost flow (or where little eddy current flows). The eddy current flowing through the inner layer R2 is below a threshold. It is preferred that the thickness of the heat-generation suppression shield 116b is equal to thicker than the thickness of the surface layer R1 where the eddy current flows (hereinafter referred to as "the surface-layer thickness" or "the eddy-current-flowing-layer thickness"). The heat-generation suppression shield 116b is not limited to the physically separated two-layer structure. As long as the effects to be obtained by the surface layer R1 and the inner layer R2 can be secured and functionally separated, the heat-generation suppression shield 116b may be configured such that it is not structurally separated into the surface layer R1 and the inner layer R2. In other words, it is satisfactory if the surface layer R1 and the inner layer R2 is structurally separated or functionally separated.

The eddy-current-flowing-layer thickness can be determined on the basis of various conditions such as: the electrical conductivity (i.e., electrical conductance) of the metal material constituting the heat-generation suppression shield 116b; the frequency included in the imaging conditions (e.g., 100 Hz to 3000 Hz); and a combination of these conditions. For example, in consideration of the eddy-current-flowing-layer thickness under the conditions where the metal material constituting the heat-generation suppression shield 116b is stainless steel or aluminum and the frequency included in the imaging conditions is 100 Hz to 3000 Hz, the thickness (in the Y-axis direction) of the heat-generation suppression shield 116b can be 23 mm to 26 mm or more.

Specifically, when the metal material constituting the heat-generation suppression shield 116b is stainless steel and the frequency included in the imaging conditions is 600 Hz, the eddy-current-flowing-layer thickness is less than 13 mm, and thus, the thickness of the heat-generation suppression shield 116b can be made approximately 13 mm or more by providing the inner layer R2. In addition, when the metal material constituting the heat-generation suppression shield 116b is aluminum (for example, A5083) and the frequency included in the imaging conditions is 600 Hz, the eddy-current-flowing-layer thickness is less than 3.7 mm, and thus, the thickness of the heat-generation suppression shield 116b can be made approximately 3.7 mm or more by providing the inner layer R2. Further, not only the thickness of the heat-generation suppression shield 116b but also the material (for example, conductivity) of the heat-generation suppression shield 116b may be set on the basis of the frequency included in the imaging conditions.

Since the winding frame 116 is provided with the heat-generation suppression shield 116b in consideration of such eddy-current-flowing layer thickness, the static magnetic field magnet 11 can be configured in a manner where the heat due to the eddy current generated in the helium vessel 113 and/or the winding frame 116 is not directly transmitted to the superconducting coil 114 and the eddy current generated in the winding frame 116 is not transmitted.

Figure 7:
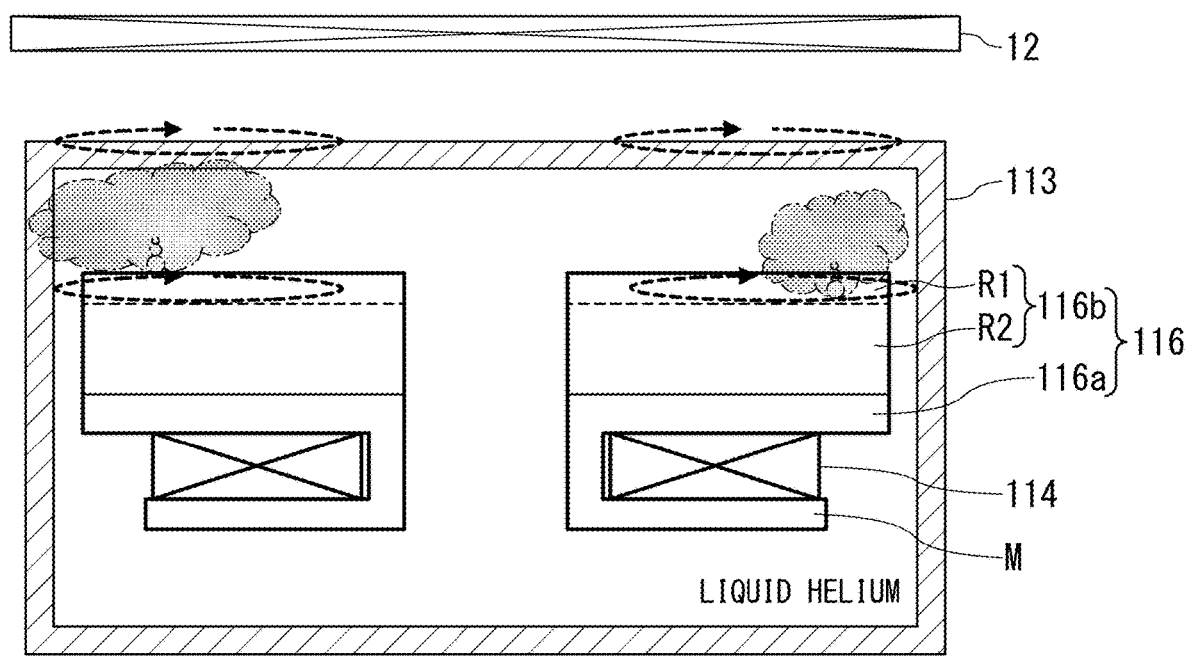
FIG. 7 is a diagram illustrating a configuration example of a heat-generation suppression shield provided in the MRI apparatus according to the first embodiment.

In addition, FIG. 7 illustrates a case where the inner layer R2 of the heat-generation suppression shield 116b is: sufficiently thicker than the surface layer R1; and sufficiently thicker than a portion M, which is part of the winding-frame main-body 116a and faces the heat-generation suppression shield 116b across the superconducting coil 114. In this case, compared to the case where the inner layer R2 is thin as shown in FIG. 6B, both the heat-generation due to the eddy current and the transmission of the eddy current can be further suppressed. Although a description has been given of the case where the static magnetic field magnet 11 has only the superconducting coil 114 in FIG. 7 (and FIGS. 6A and 6B similarly), the similar effects are obtained when the static magnetic field magnet 11 has the superconducting coils 114 and 115 (as shown in FIG. 5).

When the thickness of the heat-generation suppression shield 116b can be sufficiently secured even in consideration of the eddy-current-flowing-layer thickness, the heat-generation suppression shield 116b may be directly fixed to the outer frame of the helium vessel 113.

In addition, as shown by the dashed-line arrow in FIG. 6A, when the liquid helium existing around the superconducting coil P is gasified by the heat of the eddy current generated in the helium vessel 113, the helium gas covers the superconducting coil P in a bubbling state and thermally insulate it. Thus, it is necessary to separate the bubbling helium gas from the superconducting coil P by causing convection in the helium vessel 113.

Hence, in the winding frame 116 as shown in FIG. 6B, the heat-generation suppression shield 116b is desirably disposed with a sufficient gap from the outer frame of the helium vessel 113 such that the bubbles generated in the helium vessel 113 to diffuse such that the bubbles do not almost stay around the superconducting coil 114 (such that little bubble stays around the superconducting coil 114). Although the winding frame 116 has been described so far, the same applies to the winding frame 117 as well. The winding frame 117 includes: a winding-frame main-body 117a structurally and functionally equivalent to the winding-frame main-body 116a; and a heat-generation suppression shield 117b structurally and functionally equivalent to the heat-generation suppression shield 116b, as shown in FIG. 5. The heat-generation suppression shield 117b includes the surface layer R1 and the inner layer R2, similarly to the heat-generation suppression shield 116b.

Note that the MRI apparatus 1 described in FIG. 1 to FIG. 7 is a double-sided apparatus in which the static magnetic field magnets 11 are provided on both sides interposing the patient U. However, the MRI apparatus 1 is not limited to the double-sided aspect. For example, the MRI apparatus 1 may be a single-sided apparatus in which the static magnetic field magnet 11 is provided only on one of two sides interposing the patient U (for example, only the static magnetic field magnet 11 in front of the patient U in FIG. 4 is provided). In this case, in the static magnetic field magnet 11 provided only on one side, the winding frame 116 includes the heat-generation suppression shield 116b composed of: the surface layer R1 provided on the side of the gradient coil 12 and configured as a layer where the eddy current generated in the winding frame 116 flows; and the inner layer R2 provided on the side of the superconducting coil 114 and configured as a layer where the eddy current does not almost flow (the same applies to the winding frame 117).

According to the static magnetic field magnet(s) 11 and the MRI apparatus 1 as described above, the structure of the winding frame 116 in consideration of the eddy-current-flowing-layer thickness can suppress the heat generation of the superconducting coil 114 ascribable to the eddy current, and the same holds true for the winding frame 117.

Second Embodiment

Figure 8:
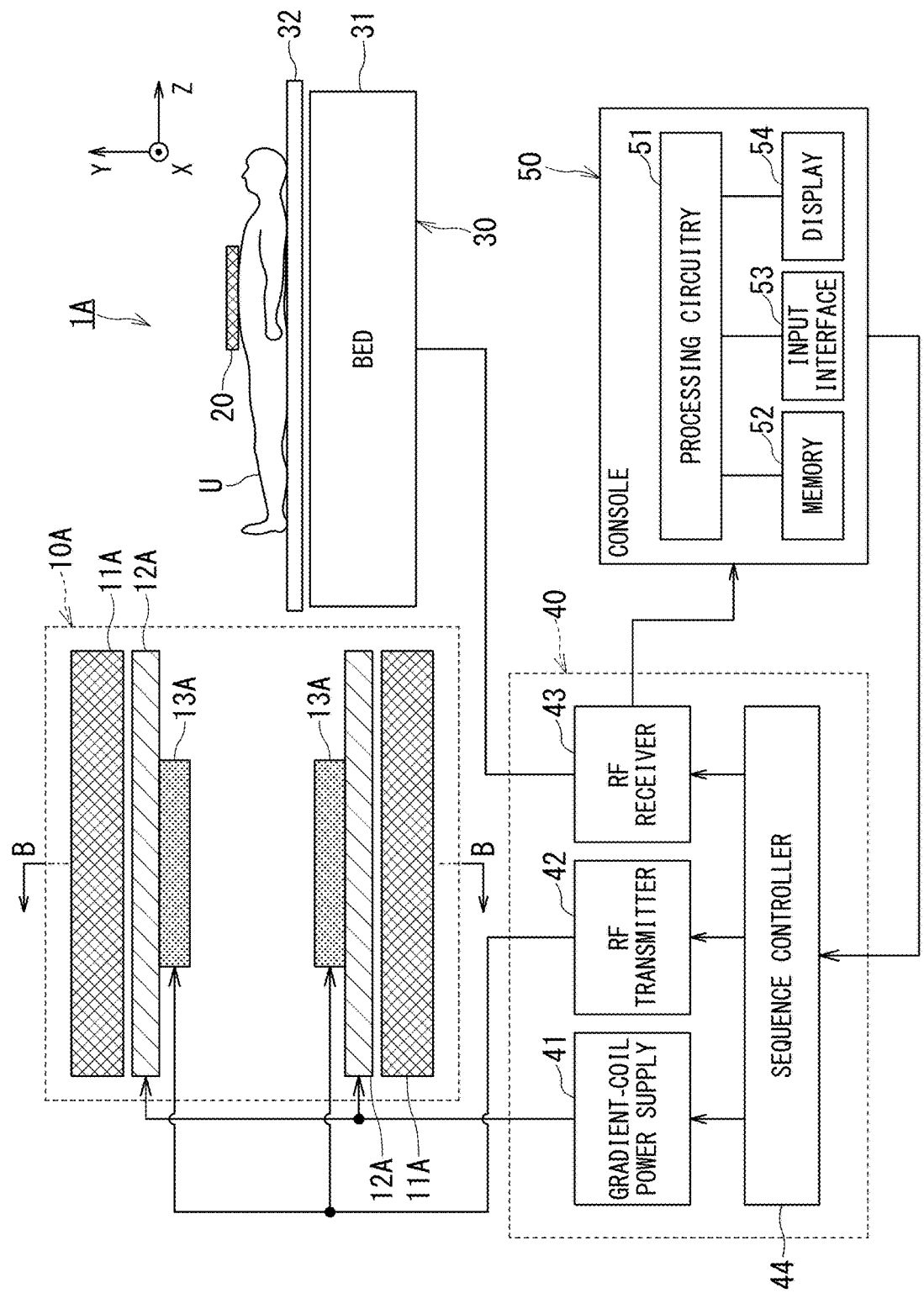
FIG. 8 is a block diagram illustrating a configuration example of an MRI apparatus according to the second embodiment.

FIG. 8 is a block diagram illustrating a configuration of a cylindrical MRI apparatus TA according to the second embodiment. In FIG. 8, the same reference signs are given to the same components as those in FIG. 4, and duplicate description is omitted. The MRI apparatus 1A includes: a gantry 10A; the receiving coil 20; the bed 30; the control cabinet 40; and the console 50. The gantry 10A and the receiving coil 20 are usually placed in the examination room configured as the shield room.

Figure 9:
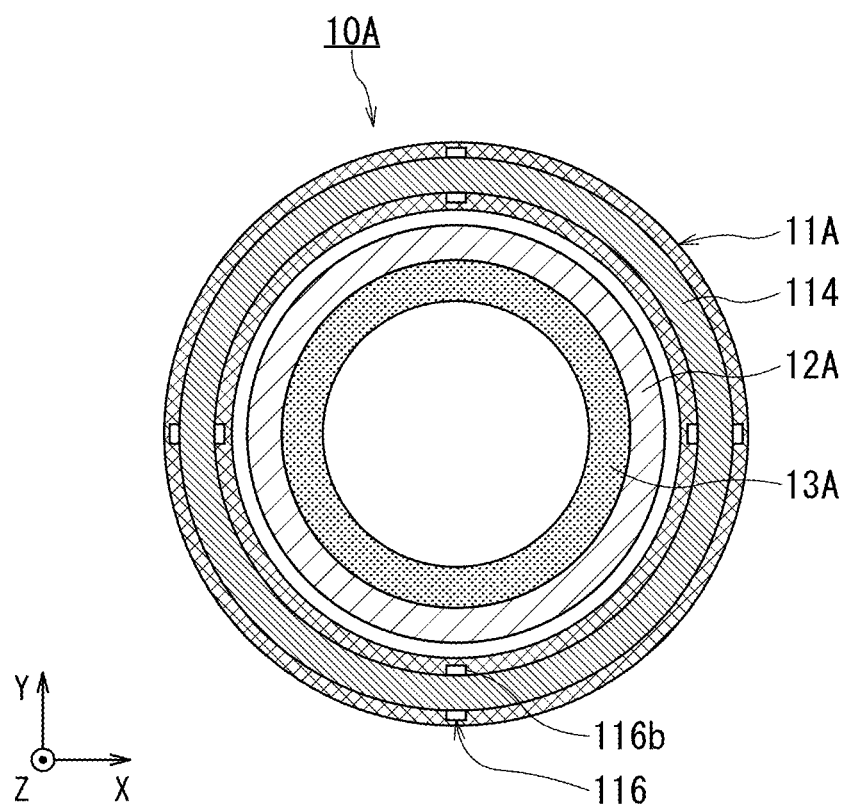
FIG. 9 is a cross-sectional view illustrating a configuration of a magnet unit provided in the MRI apparatus according to the second embodiment.

The gantry 10A include: a static magnetic field magnet 11A; a gradient coil 12A; and a transmitting coil (for example, a WB (Whole Body) coil) 13A. The static magnetic field magnet 11A, the gradient coil 12A, and the transmitting coil 13A are respectively equivalent to the static magnetic field magnet 11, the gradient coil 12, and the transmitting coil 13 shown in FIG. 4 in terms of configuration except for their approximately cylindrical shape. FIG. 9 is a cross-sectional view of the gantry 10A taken along the line B-B in FIG. 8.

As shown in FIG. 9, the gantry 10A includes the static magnetic field magnet 11A, the gradient coil 12A, and the transmitting coil 13A that are coaxially arranged in this order from the outer side. The static magnetic field magnet 11A is housed in an approximately cylindrical vacuum vessel (not shown), axis of which is parallel to the Z-axis. The static magnetic field magnet 11A includes: a radiation shield (not shown); a helium vessel (not shown); the superconducting coil 114; and the winding frame 116.

The winding frame 116 includes the winding-frame main-body 116a (shown in FIG. 5 to FIG. 7) and the heat-generation suppression shield 116b, similarly to the above-described embodiment. Further, the heat-generation suppression shield 116b includes: the surface layer R1 (shown in FIG. 5 to FIG. 7) provided on the side of the gradient coil 12A and configured as a layer where the eddy current generated in the winding frame 116 flows; and the inner layer R2 (shown in FIG. 5 to FIG. 7) provided on the side of the superconducting coil 114 and configured as a layer where the eddy current does not almost flow. Since the winding frame 116 has the above-described configuration in consideration of the eddy-current-flowing-layer thickness, the static magnetic field magnet 11 can be configured in a manner where the heat generated in the helium vessel 113 and/or the winding frame 116 is not directly transmitted to the superconducting coil 114 and the eddy current generated in the winding frame 116 is not transmitted. When the thickness of the heat-generation suppression shield 116b can be sufficiently secured, the heat-generation suppression shield 116b may be directly fixed to the outer frame of the helium vessel.

In order to keep the bubbling helium gas away from the superconducting coil 114 by causing convection in the helium vessel as described above, in the winding frame 116, the heat-generation suppression shield 116b is desirably disposed with a sufficient gap from the outer frame of the helium vessel such that the bubbles generated in the helium vessel will diffuse such that the bubbles do not almost stay around the superconducting coil 114.

According to the static magnetic field magnet 11A and the MRI apparatus TA described above, the structure of the winding frame 116 in consideration of the eddy-current-flowing-layer thickness can suppress the heat generation of the superconducting coil 114 attributable to the eddy current.

According to at least one embodiment described above, heat generation of the superconducting coil can be suppressed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions, changes, and combinations of embodiments in the form of the methods and systems described herein may be made without departing from the spirit of the inventions. The accompanying claims and their equivalents are intended to cover such forms or modifications as would fall within the scope and spirit of the inventions.

What is claimed is:

1. A static magnetic field magnet, comprising:
a vacuum vessel;
a radiation shield provided inside the vacuum vessel;
a superconducting coil provided inside the radiation shield, the superconducting coil generating a static magnetic field; and
a winding frame supporting the superconducting coil and including a heat-generation suppression shield having a surface layer on a gradient coil side and an inner layer on the superconducting coil side, wherein
the surface layer and the inner layer are structurally or functionally separated from each other,
the surface layer is configured as a layer where an eddy current generated in the winding frame flows,
the inner layer is configured as a layer where an eddy current does not almost flow,
the surface layer and the inner layer are structurally separated from each other, and
the heat-generation suppression shield is thicker than the surface layer and is thicker than a portion that is part of a main body of the winding frame and faces the heat-generation suppression shield across the superconducting coil.

2. A static magnetic field magnet comprising:
a vacuum vessel;
a radiation shield provided inside the vacuum vessel;
a superconducting coil provided inside the radiation shield, the superconducting coil generating a static magnetic field; and
a winding frame supporting the superconducting coil and including a heat-generation suppression shield having a surface layer on a gradient coil side and an inner layer on the superconducting coil side; and
a refrigerant container that houses the superconducting coil and the winding frame,
wherein the surface layer and the inner layer are structurally or functionally separated from each other,
the surface layer is configured as a layer where an eddy current generated in the winding frame flows,
the inner layer is configured as a layer where an eddy current does not almost flow, and
the heat-generation suppression shield is directly fixed to the refrigerant container.

3. A static magnetic field magnet, comprising:
a vacuum vessel;
a radiation shield provided inside the vacuum vessel;
a superconducting coil provided inside the radiation shield, the superconducting coil generating a static magnetic field; and
a winding frame supporting the superconducting coil and including a heat-generation suppression shield having a surface layer on a gradient coil side and an inner layer on the superconducting coil side, wherein
the surface layer and the inner layer are structurally or functionally separated from each other,
the surface layer is configured as a layer where an eddy current generated in the winding frame flows,
the inner layer is configured as a layer where an eddy current does not almost flow,
a thickness of the heat-generation suppression shield is equal to or thicker than a thickness of the surface layer, which is calculated based on a material of the surface layer,
the static magnetic field magnetic further comprises a refrigerant container that houses the superconducting coil and the winding frame, and
the winding frame supporting the superconducting coil has a structure with the thickness of the heat-generation suppression shield sufficient to prevent transmission of an eddy current generated in the heat-generation suppression shield to the superconducting coil in such a manner that bubbles generated in the refrigerant container do not almost stay around the superconducting coil, the winding frame being disposed with a sufficient gap from an outer frame of the refrigerant container.

4. An MRI apparatus, comprising:
the static magnetic field magnet according to claim 3;
a gradient coil configured to generate a gradient magnetic field;
a transmitting coil configured to transmit an RF pulse; and
processing circuitry configured to perform imaging by controlling an operation of the static magnetic field magnet, the gradient coil, and the transmitting coil.

5. The MRI apparatus according to claim 4, wherein the heat-generation suppression shield is disposed between the gradient coil and the superconducting coil.

6. The MRI apparatus according to claim 4, wherein the gradient coil comprises:
a main coil configured to generate respective gradient magnetic fields in orthogonal three-axis directions; and
a shield coil disposed outside the main coil.

7. The MRI apparatus according to claim 4, wherein a material and a thickness of the heat-generation suppression shield are set based on a frequency included in imaging conditions.

* * * * *